United States Patent
Mori (10) Patent No.: US 10,442,024 B2
(45) Date of Patent: Oct. 15, 2019

(54) WELDING APPARATUS

(71) Applicant: CUTLAND JAPAN CO., LTD., Tokyo (JP)

(72) Inventor: Kenichi Mori, Kawasaki (JP)

(73) Assignee: CUTLAND JAPAN CO., LTD., Tokyo (JP)

( * ) Notice: Subject to any disclaimer, the term of this patent is extended or adjusted under 35 U.S.C. 154(b) by 602 days.

(21) Appl. No.: 15/231,891

(22) Filed: Aug. 9, 2016

(65) Prior Publication Data

US 2017/0056998 A1   Mar. 2, 2017

(30) Foreign Application Priority Data

Sep. 2, 2015   (JP) .................. 2015/173312

(51) Int. Cl.
*B23K 9/028* (2006.01)
*B23K 37/02* (2006.01)
*B23K 101/06* (2006.01)

(52) U.S. Cl.
CPC ........ *B23K 9/0286* (2013.01); *B23K 37/0211* (2013.01); *B23K 37/0217* (2013.01); *B23K 37/0276* (2013.01); *B23K 37/0282* (2013.01); *B23K 2101/06* (2018.08)

(58) Field of Classification Search
CPC .... B23K 9/0286; B23K 9/028; B23K 9/0282; B23K 37/0211; B23K 37/0217; B23K 37/0276; B23K 37/0282; B23K 2101/06
See application file for complete search history.

(56) References Cited

U.S. PATENT DOCUMENTS

| | | | | |
|---|---|---|---|---|
| 3,128,368 A | * | 4/1964 | Franz ................ | B23K 9/0209 219/125.12 |
| 3,179,781 A | * | 4/1965 | Ross ................... | B23K 9/0286 219/60 A |
| 3,193,656 A | * | 7/1965 | Bell .................... | B23K 9/0286 219/60 A |
| 3,194,936 A | * | 7/1965 | Rohrberg ............ | B23K 9/0286 219/60 A |
| 3,575,364 A | * | 4/1971 | Frederick ............ | B23K 9/0286 266/56 |
| 3,688,615 A | * | 9/1972 | Protze ................. | B23D 45/126 82/70.2 |
| 3,748,433 A | * | 7/1973 | Gwin .................. | B23K 9/0286 219/124.34 |
| 3,777,101 A | * | 12/1973 | Gwin .................. | B23K 9/0286 219/60 A |
| 3,870,849 A | * | 3/1975 | Rygiol ................ | B23K 9/0282 219/60 A |

(Continued)

*Primary Examiner* — Christopher S Kim
(74) *Attorney, Agent, or Firm* — Rankin, Hill & Clark LLP (57) ABSTRACT

A welding apparatus includes a housing having facing surfaces in the axial direction, and a welding head turning gear and first to third ring gears inside of the housing. A guide surface is formed on the facing surfaces. The welding head turning gear is coupled to a guide member, and the first to third ring gears are supported by the welding head turning gear and the guide member. Since a roller provided to the guide member rolls on the guide surface to rotatably support the first to third ring gears with respect to the housing, the welding apparatus can be lighter in weight and more compact compared to a conventional welding apparatus.

6 Claims, 9 Drawing Sheets

(56) References Cited

U.S. PATENT DOCUMENTS

| | | | | |
|---|---|---|---|---|
| 5,710,403 | A * | 1/1998 | Jusionis | B23K 9/0286 219/125.11 |
| 6,459,062 | B1 * | 10/2002 | Guerrina | B23K 37/0533 219/60 A |
| 7,414,220 | B2 * | 8/2008 | Oyster | B23K 9/0286 219/60 A |
| 9,085,039 | B1 * | 7/2015 | Theriot | B23K 7/006 |
| 9,919,387 | B2 * | 3/2018 | Mori | B23K 37/0247 |
| 10,166,621 | B2 * | 1/2019 | Ito | B23K 9/0286 |
| 2007/0297556 | A1 * | 12/2007 | Spencer | B23K 9/0286 376/245 |
| 2017/0056998 | A1 * | 3/2017 | Mori | B23K 9/0286 |
| 2017/0252845 | A1 * | 9/2017 | Cash | B23K 37/0282 |
| 2018/0001422 | A1 * | 1/2018 | Rajagopalan | B23K 26/044 |
| 2019/0009354 | A1 * | 1/2019 | Atin | B23K 37/0217 |

* cited by examiner

WELDING APPARATUS

FIELD OF THE INVENTION

The present disclosure relates to an apparatus for welding a workpiece to be welded that is cylindrical in shape, or specifically, a pipe. Hereinafter, such device will be referred to simply as "welding apparatus."

DESCRIPTION OF RELATED ART

A welding apparatus for welding a pipe by pivoting a welding torch in the circumferential direction of the pipe is known conventionally. Generally, in such welding apparatus, since a power supply wire connected to the welding torch winds around an outer peripheral surface of the pipe when the welding torch pivots in the circumferential direction of the pipe, the power supply wire needs to be wound beforehand around the outer peripheral surface of the pipe in a direction opposite to the pivoting direction of the welding torch.

The above-described winding operation of the power supply wire in the welding apparatus is complicated, which has been an obstacle to efficient welding work. Under such circumstances, a welding apparatus without the power supply wire required to be wound around the pipe beforehand was developed, as will be described below.

[Patent Document 1] Japanese Unexamined Patent Application Publication No. 2013-184176

A welding apparatus disclosed in Patent Document 1 includes a face plate gear in annular shape rotatably supported by a plurality of rollers attached to an inner diameter side of a housing in annular shape, and a gear for wire and a gear for torch, both of which are relatively rotatably attached to the face plate gear. The housing is coupled via a ball screw mechanism to a base fixed on the outer peripheral surface of the pipe. Using this ball screw mechanism, the housing is configured to move forward and backward in the axial direction of the pipe. The face plate gear, the gear for wire and the gear for torch include external teeth provided on the entire circumference of the outer peripheral surface, and internal teeth provided on the entire circumference of the inner peripheral surface. To the face plate gear, the gear for wire and the gear for torch, torque is transmitted via the external teeth respectively from a face plate gear driving device, a gear-for-wire driving device and a gear-for-torch driving device. The welding torch interlocks with the face plate gear and pivots in the circumferential direction of the pipe along with a rotation of the face plate gear. On one hand, when a difference is generated in rotating speed between the face plate gear and the gear for wire in a state in which the face plate gear, the gear for wire and the gear for torch are rotating in a same direction at a same rotating speed, a wire necessary for welding is sent out. On the other hand, when a difference is generated in rotating speed between the face plate gear and the gear for torch, the welding torch can approach to or recede from the pipe. Therefore, by changing a rotating speed of each electric motor of the face plate gear driving device, the gear-for-wire driving device and the gear-for-torch driving device in the state in which the face plate gear, the gear for wire and the gear for torch rotate in the same direction at the same speed under control of each of the electric motors, the wire can be sent out or the welding torch can be moved.

According to the welding apparatus disclosed in Patent Document 1, since the electric motor serving as a driving device can be fixed to the housing, the power supply wire for feeding electrical power to the electric motor need not be wound around the pipe beforehand as a conventional welding apparatus.

However, in the welding apparatus disclosed in Patent Document 1, the rotating speed of each of the electric motors should be controlled separately, which complicates the structure of a control device as well as a large manufacturing cost thereof. In addition, the welding apparatus may easily increase in size and weight from the following viewpoints. First, the housing itself moves forward and backward in the axial direction of the pipe using the ball screw mechanism, leading to a large parts count as well as requiring high rigidity of the housing and the face plate gear. Second, the plurality of rollers for supporting high-rigidity disc plate gears need be relatively large in size. And third, the configuration of the rollers to be attached to the inner diameter side of the housing necessarily requires a large dimension in the diameter direction of the face plate gear.

Moreover, since the internal and external gears are formed on the entire circumferences of the inner and outer peripheral surfaces of the gear for wire and the gear for torch, the manufacturing process of the welding apparatus needs many steps.

BRIEF DESCRIPTION

In order to solve the problems associated with the above-described prior art, an object of the present disclosure is to provide a light-weight and compact welding apparatus. Another object of the present disclosure is to provide a welding apparatus with a reduced cost of processing and manufacturing.

According to one aspect, a welding apparatus includes a housing, a welding head turning gear, at least one ring gear in annular shape, a turning input gear and a ring input gear, a plurality of electric motors, a ring output gear and a welding head. The housing has a guide surface continuous in the circumference direction of a facing surface in the axial direction. The welding head gear is disposed between the facing surfaces and includes internal teeth on the entire circumference of an inner peripheral surface. The at least one ring gear in annular shape is disposed between the facing surfaces, and includes internal gears on the entire circumference of an inner peripheral surface and external gears on at least part of an outer peripheral surface, and is provided pivotably at more than a predetermined angle with respect to the welding head turning gear. The turning input gear is engaged with the internal teeth of the welding head turning gear, and the ring input gear is engaged with the internal teeth of the ring gear. The plurality of electric motors is coupled to the housing so as to be positioned at one side in the axial direction with respect to the housing, and transmits torque to the turning input gear and the ring input gear. The output gear is coupled to the welding head turning gear and engaged with the external teeth. The welding head includes a welding torch positioned at the other side in the axial direction with respect to the housing and a torque use means to which torque is transmitted from the ring output gear. The welding head turning gear and the ring gear are rotatably supported with respect to the housing by a guide member with respect to the guide surface. Alternatively, the welding head turning gear in annular shape is disposed between the facing surfaces and includes external teeth on the entire circumference of the outer peripheral surface; the at least one ring gear in annular shape is disposed between the facing surfaces and includes the external teeth on the entire circumference of the outer peripheral surface and the internal teeth on at least part of the inner peripheral surface, and is provided pivotably at more than a predetermined angle with respect to the welding head running gear; the ring input gear is engaged with the external teeth of the welding head turning gear, and the ring input gear is engaged with the external teeth of the ring gear; and the ring output gear is coupled to the welding head turning gear and engaged with the internal teeth.

Since the housing in annular shape has the guide surface continuous in the circumferential direction of the facing surfaces in the axial direction, and the welding head turning gear and the ring gear are rotatably supported with respect to the housing by the guide member with respect to the guide surface, a large-sized roller need not be provided for supporting the welding head turning gear as in a conventional art. Thus, as a radial dimension of the welding head turning gear can be reduced, the welding apparatus can be lighter in weight and more compact in size compared to the conventional art.

Furthermore, if the ring gear is provided pivotably only at a predetermined angle with respect to the welding head turning gear, and the external or internal teeth engaged with the ring output gear are provided within a range of this predetermined angle, no gears engaged with the ring output gear need be provided on the entire circumference of the inner or outer peripheral surface, thereby enabling to reduce processing cost.

Moreover, the torque use means may be a wire feeding mechanism, a torch axial direction movement mechanism or a torch radial direction movement mechanism. The torque use means as such can feed a wire required for welding ahead of the welding torch, or move the welding torch forward or backward in the axial or radial direction. Specifically, by providing the torch axial direction movement mechanism, no ball screw mechanism for moving the housing forward and backward is required as in a conventional art, which contributes to reduction in parts count and weight.

Furthermore, a differential device for transmitting torque to the turning input gear and the ring input gear should be provided between the electric motors and the housing so that the welding head turning gear and the ring gear rotate in a same direction at a same rotating speed when one of the electric motors is operative and the other electric motors are inoperative, and the ring gear rotates at a different rotating speed from the welding head turning gear when the other electric motors are operative. Due to this, the welding head turning gear and the ring gear can rotate by means of one of the electric motors, enabling to achieve simplification of a device for controlling the electric motors.

DETAILED DESCRIPTION

Following is a description by way of example only with reference to FIGS. 1 to 9 of embodiments of the present disclosure. Still, the present disclosure is not limited to these embodiments.

Figure 1:
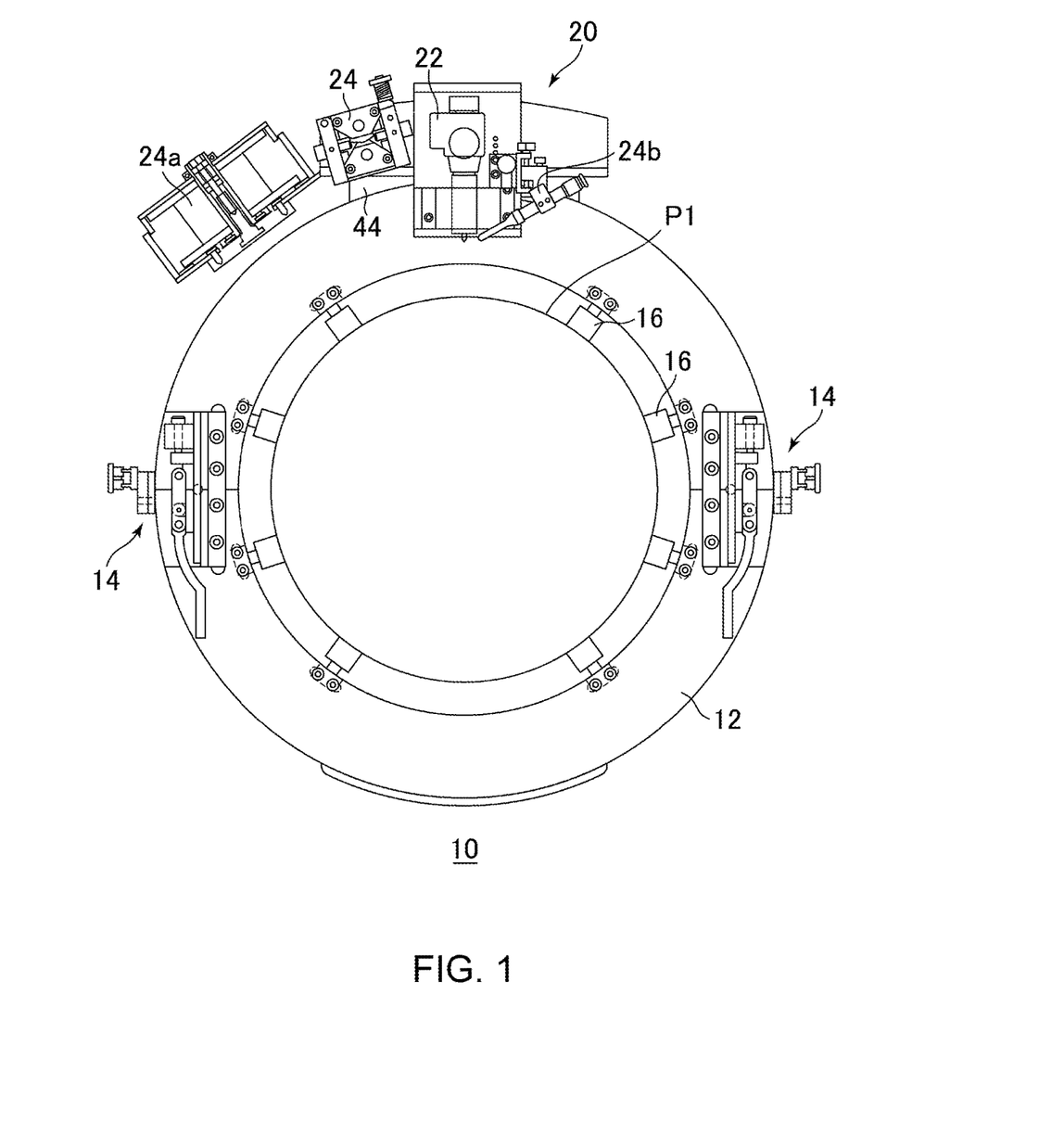
FIG. 1 is a front view illustrating a first embodiment.
Figure 2:
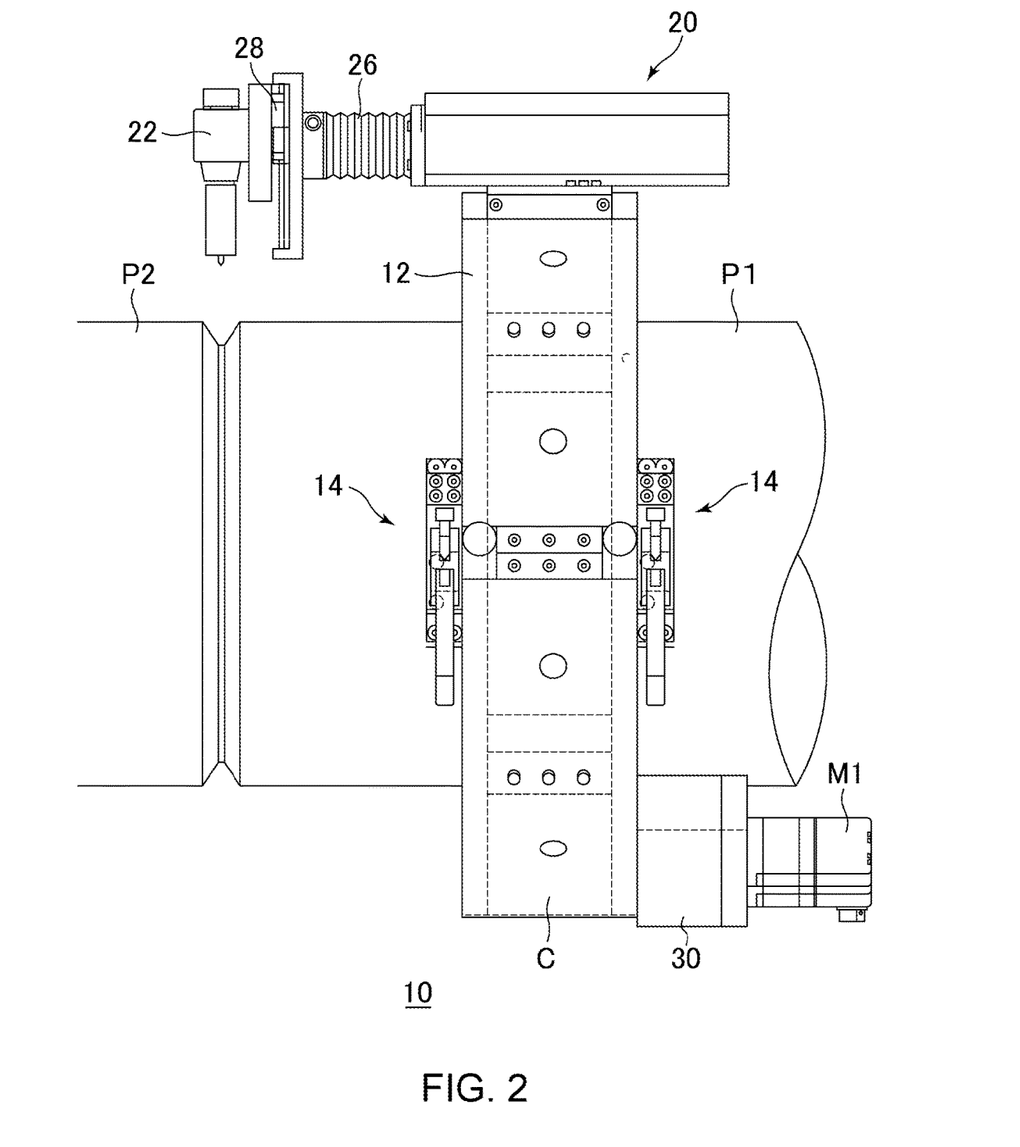
FIG. 2 is a side view illustrating the first embodiment.
Figure 3:
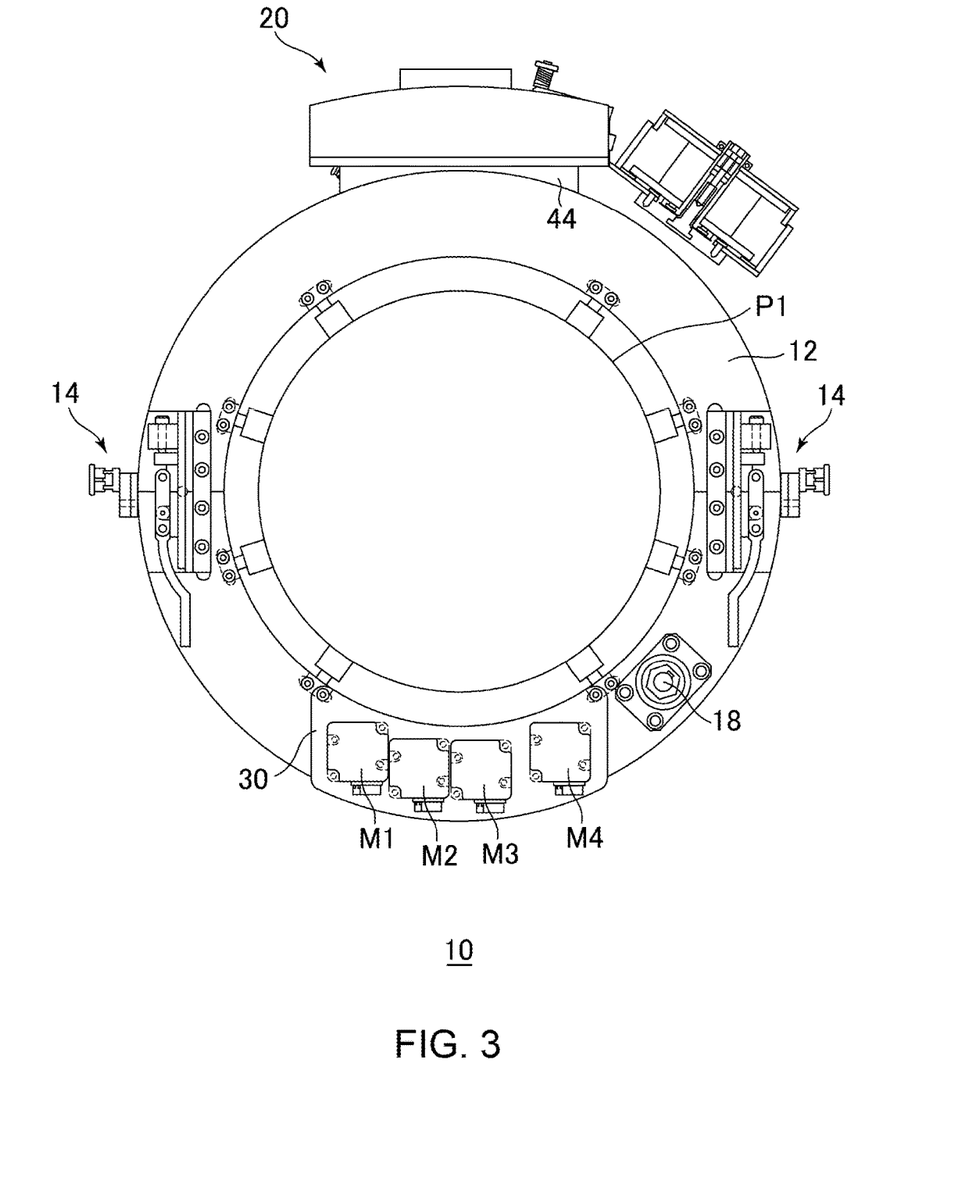
FIG. 3 is a rear view illustrating the first embodiment.

FIGS. 1 to 3 are views respectively illustrating the front, side and rear views of a welding apparatus 10 of the first embodiment. As shown in these figures, the welding apparatus 10 includes a housing 12 in annular shape. The housing 12 is fixed by a plurality of fixing members 16, provided in the circumferential direction, on an outer peripheral surface of the pipe P1, which is an example of a workpiece. Also, the housing 12 is configured to have facing surfaces 13, 13 in the axial direction (see FIG. 6) and be separable into top and bottom sections, which are shown in the figures to be coupled by a coupling tool 14. Remarkably, the housing is separable into more than two sections.

As shown in FIG. 2, when the pipe P1 and a pipe P2 are welded together, the welding apparatus 10 is attached to either one of the pipe P1 or P2 (to P1 in FIG. 1). To one side of the housing 12 in the axial direction (to the right-hand side in the figure), a plurality of electric motors M1-M4 (see also FIG. 3) is coupled to the housing 12 via a differential device 30. On the other hand, the welding head 20 is positioned on the outer diameter side of the housing 12, and a welding torch 22 coupled to the welding head 20 is provided on the other side of the housing 12 in the axial direction (on the left-hand side in the figure). The welding head 20 and the welding torch 22 are intended to arc-weld workpieces such as the pipes P1 and P2. It should be noted that in FIG. 2, a cover C is attached to the welding apparatus 10 in the circumferential direction.

As shown in FIG. 3, a power supplier 18 is provided on the surface of the housing 12, on which the electric motors M1 to M4 are attached. Also, a power-supply conductor (not shown in the figure) for supplying electric power to the welding head 20 and eventually to the welding torch 22 is inserted into the power supplier 18. Any description as to how to supply electric power, for instance, to employ an annular electrode (see reference character E in FIG. 6) as in Patent Document 1, will be omitted herein as it is not covered by the present disclosure. Similarly, any description how to supply shielding gas will be omitted herein.

Figure 4:
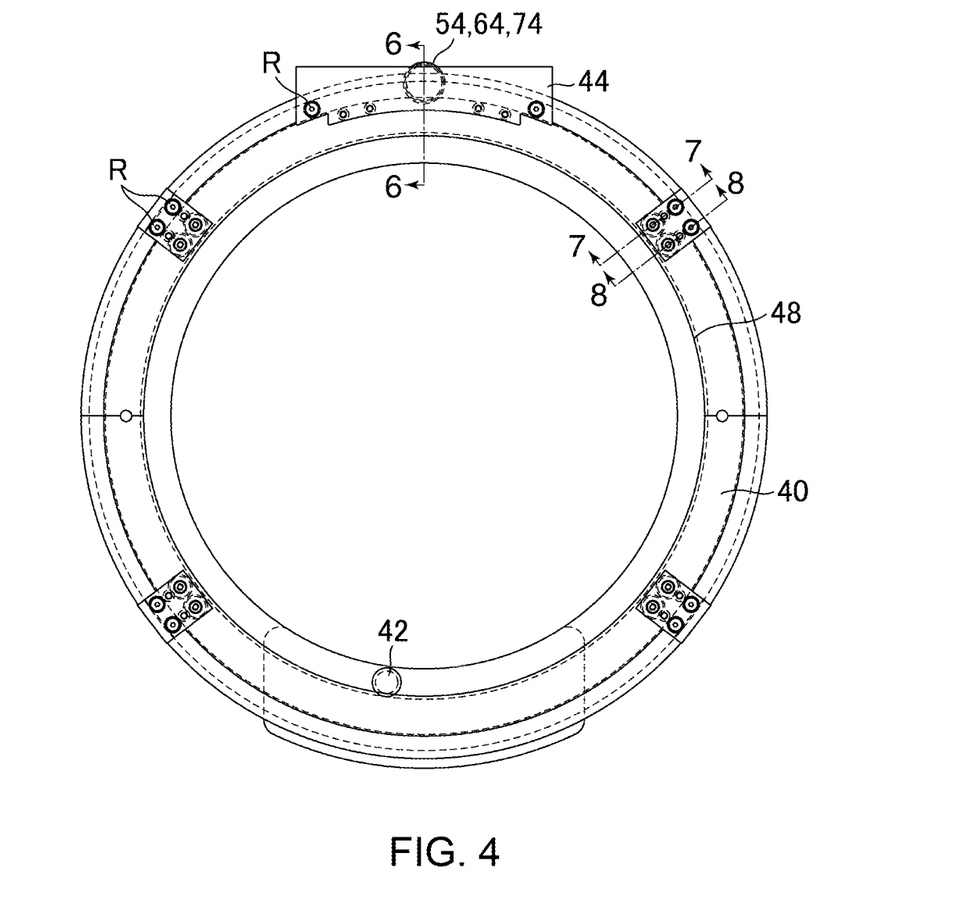
FIG. 4 is a front view illustrating the first embodiment from which a housing in the axial direction is removed.

As shown in FIG. 4, a welding head turning gear 40 is installed inside of the housing 12. It should be noted that first to third input gears 52, 62, 72, which will be described later, are not shown in FIG. 4 for the purpose of illustration. Internal teeth 48 are formed on the entire circumference of the inner peripheral surface of the welding head turning gear 40. Moreover, a pedestal 44 coupled to the welding head 20 is coupled to the outer peripheral side of the welding head turning gear 40 (see also FIGS. 1 and 3). As will be described later, the welding head turning gear 40 is rotatably installed with respect to the housing, whereby torque is transmitted to the welding head turning gear 40 from a turning input gear 42 engaged with the internal teeth 48. Thus, when torque is transmitted to the welding head turning gear 40 via the turning input gear 42, the welding head turning gear 40 rotates and then the welding head 20 also rotates in interlock with the welding head turning gear 40.

Figure 5:
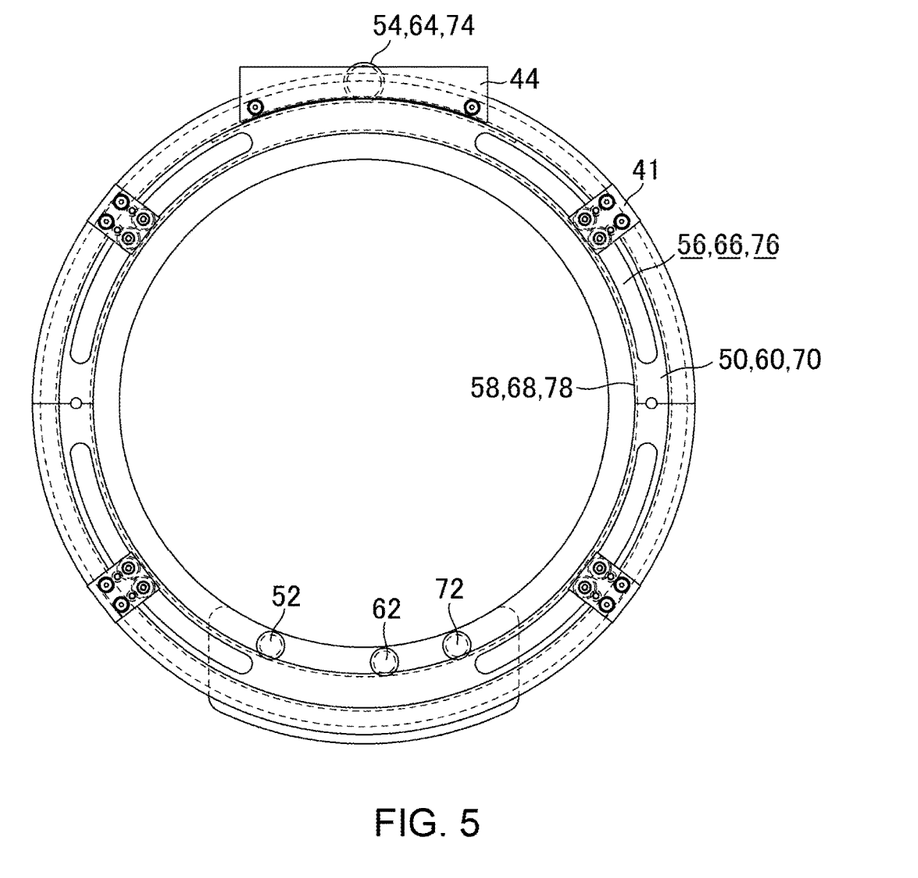
FIG. 5 is a front view illustrating the first embodiment from which the housing in the axial direction and a welding head turning gear are removed.
Figure 6:
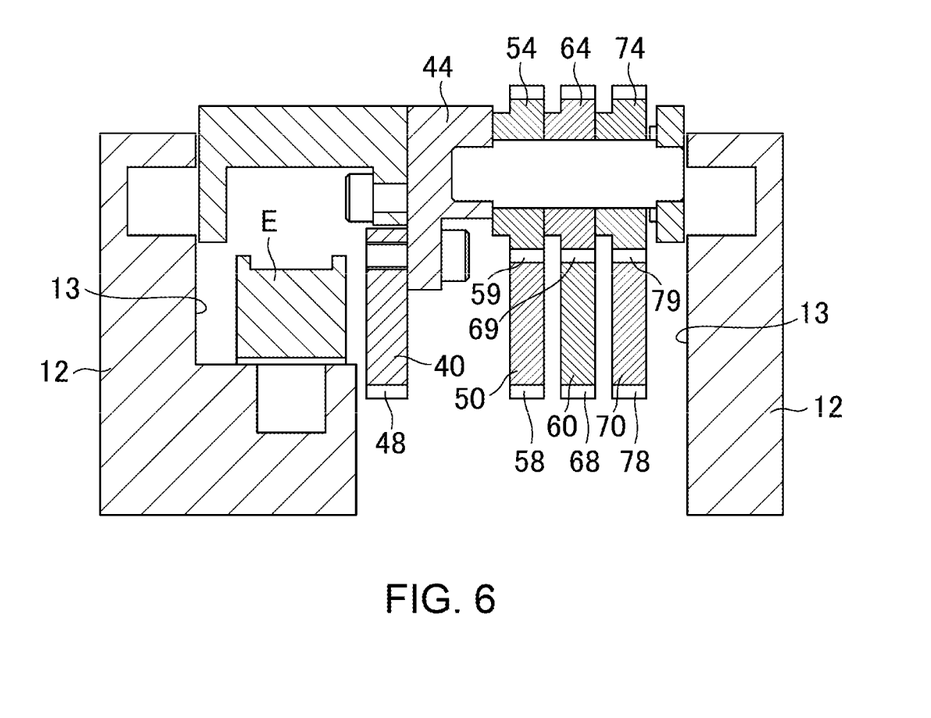
FIG. 6 is a cross-sectional view taken along the line 6-6 in FIG. 4.

As shown in FIGS. 5 and 6, the welding apparatus 10 includes first to third ring gears 50, 60, 70. The above-described turning input gear 42 is not shown in FIG. 5 for the purpose of illustration. Internal teeth 58, 68, 78 are formed respectively on entire circumferences of the first to third ring gears 50, 60, 70. The first to third ring gears 50, 60, 70 are also rotatable with respect to the housing 12, as will be described later, and thus torque is transmitted from the first to third input gears 52, 62, 72 engaged respectively with the internal teeth 58, 68, 78. Accordingly, when torque is transmitted to the first to third ring gears 50, 60, 70 respectively via the first to third ring input gears 52, 62, 72, the first to third ring gears 50, 60, 70 rotate. In addition, as will be described later, each of the first to third ring gears 50, 60, 70 is installed so as to be rotatable only at a predetermined angle with respect to the welding head turning gear 40.

As shown in FIG. 6, the pedestal 44 attached to the outer peripheral side of the welding head turning gear 40 pivotally supports the first to third ring output gears 54, 64, 74. Consequently, the first to third ring output gears 54, 64, 74 are coupled to the welding head turning gear 40 so as to interlock with the welding head turning gear 40. The first to third ring output gears 54, 64, 74 are engaged respectively with external teeth 59, 69, 79 formed respectively on outer peripheral surfaces of the first to third ring gears 50, 60, 70. Due to this, torque is output to each of the first to third ring output gears 54, 64, 74 when each of the ring gears 50, 60, 70 rotates or pivots at a different rotating speed with respect to the welding head turning gear 40. It should be noted that the external teeth 59, 69, 79 may be formed respectively on the entire circumferences of the outer peripheral surfaces of the first to third ring gears 50, 60, 70, and also be formed only on part of the outer peripheral surfaces within a range of angle at which the first to third ring gears 50, 60, 70 are pivotable with respect to the welding head turning gear 40. This can reduce the processing cost.

As shown in FIGS. 1 to 2, the torque transmitted to the first to third ring output gears 54, 64, 74 is transmitted respectively to a wire feeding mechanism 24, a torch axial movement mechanism 26 and a torch radial movement mechanism 28, which serve as torque use means provided on the welding head 20.

Provided with a gear mechanism including the one-way clutch (not shown in the figure) inside of the wire feeding mechanism 24, for example, the wire feeding mechanism 24 is configured so as to feed a welding wire (not shown in the figure) to a wire guide 24b wound around a wire holder 24a also due to torque in any rotating or pivoting direction of the first ring output gear 54.

The torch axial movement mechanism 26 converts the torque transmitted from the second ring output gear 64 into a linear-motion via a known linear-motion conversion mechanism (not shown in the figure). Due to this, the welding torch 22 moves forward and backward in the axial direction of the housing 12 depending on a rotating or pivoting direction of the second ring output gear 64.

The torch radial movement mechanism 28 converts the torque transmitted from the third ring output gear 74 into a linear-motion via a known linear-motion conversion mechanism (not shown in the figure). Due to this, the welding torch 22 moves forward and backward in the radial direction of the housing 12 depending on a rotating or pivoting direction of the third ring output gear 74.

As described above, the wire feeding mechanism 24 can continuously supply the welding wire using torque in any rotating or pivoting direction of the first ring output gear 54. One the other hand, the welding torch 22 poses no obstacle in welding the pipes P1 and P2 as far as the welding torch 22 can move forward and backward only by a predetermined distance in the axial or radial direction of the housing 12. Therefore, the first to third ring gears 50, 60, 70 need not be rotatably provided with respect to the welding head turning gear 40, but may be pivotable, similar to the welding apparatus 10, within a range of predetermined of angle. Moreover, the angle at which the first to third ring gears 50, 60, 70 rotate may be determined in consideration of, for example, a distance by which the welding torch 22 moves forward or backward in the axial or radial direction.

Figure 7:
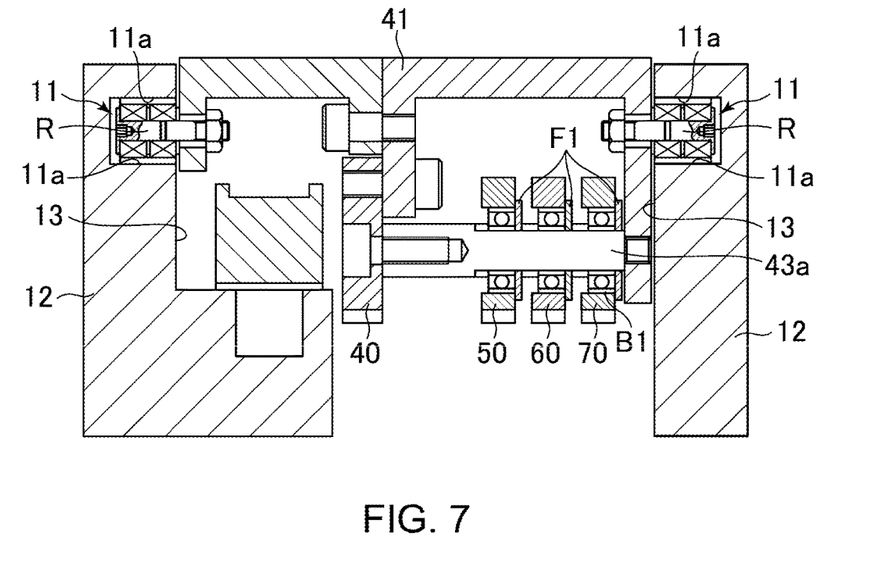
FIG. 7 is a cross-sectional view taken along the line 7-7 in FIG. 4.
Figure 8:
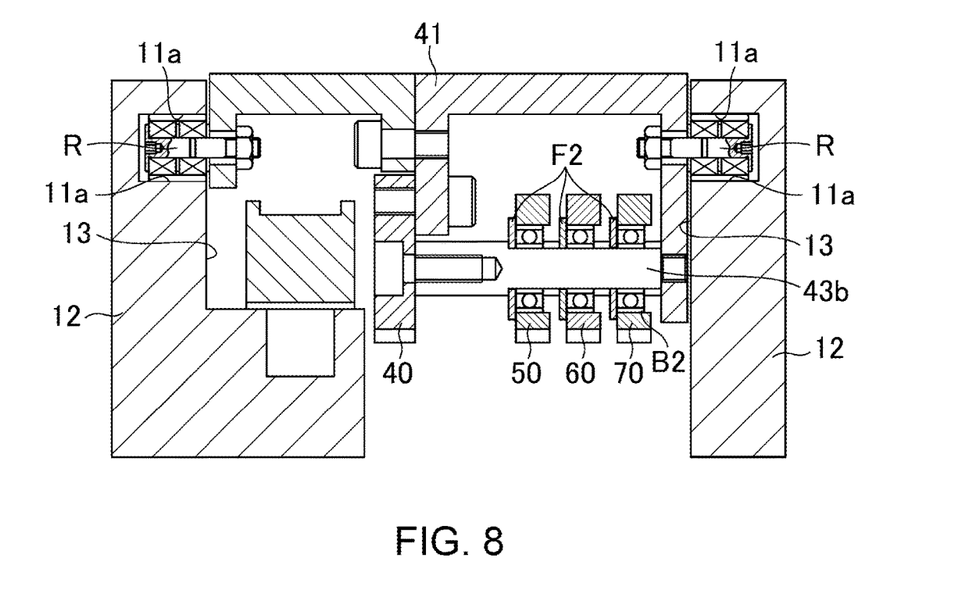
FIG. 8 is a cross-sectional view taken along the line 8-8 in FIG. 4.

Next, a supporting structure of the welding head turning gear 40 and the first to third ring gears 50, 60, 70 will be described below. As shown in FIG. 5, a guide member is installed at a plurality of points in the circumferential direction of the welding head turning gear 40. FIGS. 7 and 8 are 7-7 and 8-8 line sectional views of FIG. 4 respectively.

As shown in FIGS. 7 and 8, the housing 12 has the facing surfaces 13, 13 in the axial direction between which the welding head turning gear 40 and the first to third ring gears 50, 60, 70 are disposed. A guide groove 11, 11 is formed on each of the facing surfaces 13, 13. The guide groove 11, 11 is provided continuously on the entire circumference in the circumferential direction of the housing 12, although illustration thereof is omitted in the figure. In this manner, a surface in the radial direction (guide surface) 11a, being continuous in the circumferential direction, is formed on the housing 12. As the case may be, the inner or outer peripheral surface of the housing 12 can be used as the guide surface without providing the guide groove 11, 11.

The guide member 41 includes a roller R, R that is coupled to the welding head turning gear 40 and serves as a guide member fitted into the guide groove 11, 11. Thus, the roller R, R rolls on the guide surface 11a, whereby the welding head turning gear 40 is rotatably supported with respect to the housing 12. Remarkably, a plurality of rows of the guide groove 11, 11 and the roller R, R may be provided in the radial direction of the housing 12. On the other hand, the first to third ring gears 50, 60, 70 are supported, as will be described, by the guide member 41 and the welding head turning gear 40, and therefore rotatably supported with respect to the housing. Remarkably, the first to third ring gears 50, 60, 70 can be rotatably supported with respect to the housing 12 by, for example, attaching another roller that rolls on another guide surface provided to the housing 12 to shafts 43a, 43b (see FIGS. 7 and 8) supporting the first to third ring gears 50, 60, 70, although an illustration thereof is omitted in the figure.

Here, as shown in FIG. 4, the roller R, R fitted into the guide groove 11, 11 may be provided to the pedestal 44. Due to this, the welding head turning gear 40 and the first to third ring gears 50, 60, 70, as well as the guide member 41, can be supported stably. It should be noted that apart from the roller R, R, for example, a protruding portion onto which lubricant is applied may be employed as a guide member as far as the welding head turning gear 40 can rotate smoothly.

In this manner, the welding apparatus 10 is configured so that the welding head turning gear 40 and the first to third ring gears 50, 60, 70 are rotatably supported with respect to the housing 12, using the guide surface 11a, 11a formed continuously in the circumferential direction on the facing surface 13, 13 of the housing 12. Consequently, the welding apparatus needs no large-size roller unlike a conventional one, resulting in smaller dimensions in the radial direction of the welding head turning gear 40, and can accordingly achieve decrease in size and weight.

As shown in FIG. 5, cutout portions 56, 66, 76 are provided respectively to the first to the third ring gears 50, 60, 70 to match a position of the guide member 41. The cutout portions 56, 66, 76 are provided with the guide member 41 being positioned at the center thereof within a range of more than or equal to a predetermined angle at which the first to third ring gears 50, 60, 70 pivot with respect to the welding head turning gear 40.

As shown in FIGS. 7 and 8, the shafts 43a, 43b fixed to the welding head turning gear 40 and the guide member 41 penetrate the cutout portions 56, 66, 76. The shafts 43a, 43b respectively include bearings B1, B2 each of which rotatably supports the first to third ring gears 50, 60, 70.

In this manner, according to the configuration to provide the cutout portions 56, 66, 76 to the first to third ring gears 50, 60, 70, and support, using the cutout portions 56, 66, 76, the first to third ring gears 50, 60, 70 by means of the bearings B1, B2 coupled to the welding head turning gear 40 and the guide member 41, the first to third ring gears 50, 60, 70 can be rotatably provided with respect to the housing and pivotably with respect to the welding head turning gear 40, with an attempt to reduce weight of the first to third ring gears 50, 60, 70.

It should be noted that a flange F1 is provided to one side of the bearing B1 in the axial direction, and a flange F2 is provided to the other side of the bearing B2 in the axial direction. Each of the first to third ring gears 50, 60, 70 is sandwiched between the flanges F1, F2 for preventing the first to third ring gears 50, 60, 70 from moving in the axial direction. This can stabilize the engagement of the external teeth 59, 69, 70 formed respectively on the outer peripheral surfaces of the first to third ring gears 50, 60, 70 respectively with the first to third ring output gears 54, 64, 74.

Apart from the above-described configuration, for instance, convexities and grooves, or grooves and convexities, can be provided respectively on facing surfaces of the welding head turning gear 40 and the first to third ring gears 50, 60, 70, in the circumferential direction, so as to relatively rotatably or pivotably fit into each other, although an illustration thereof is omitted in the figure. In effect, the first to third ring gears 50, 60, 70 should be configured to pivot (as well as rotate) at larger than or equal to a predetermined angle with respect to the welding head turning gear 40.

Figure 9:
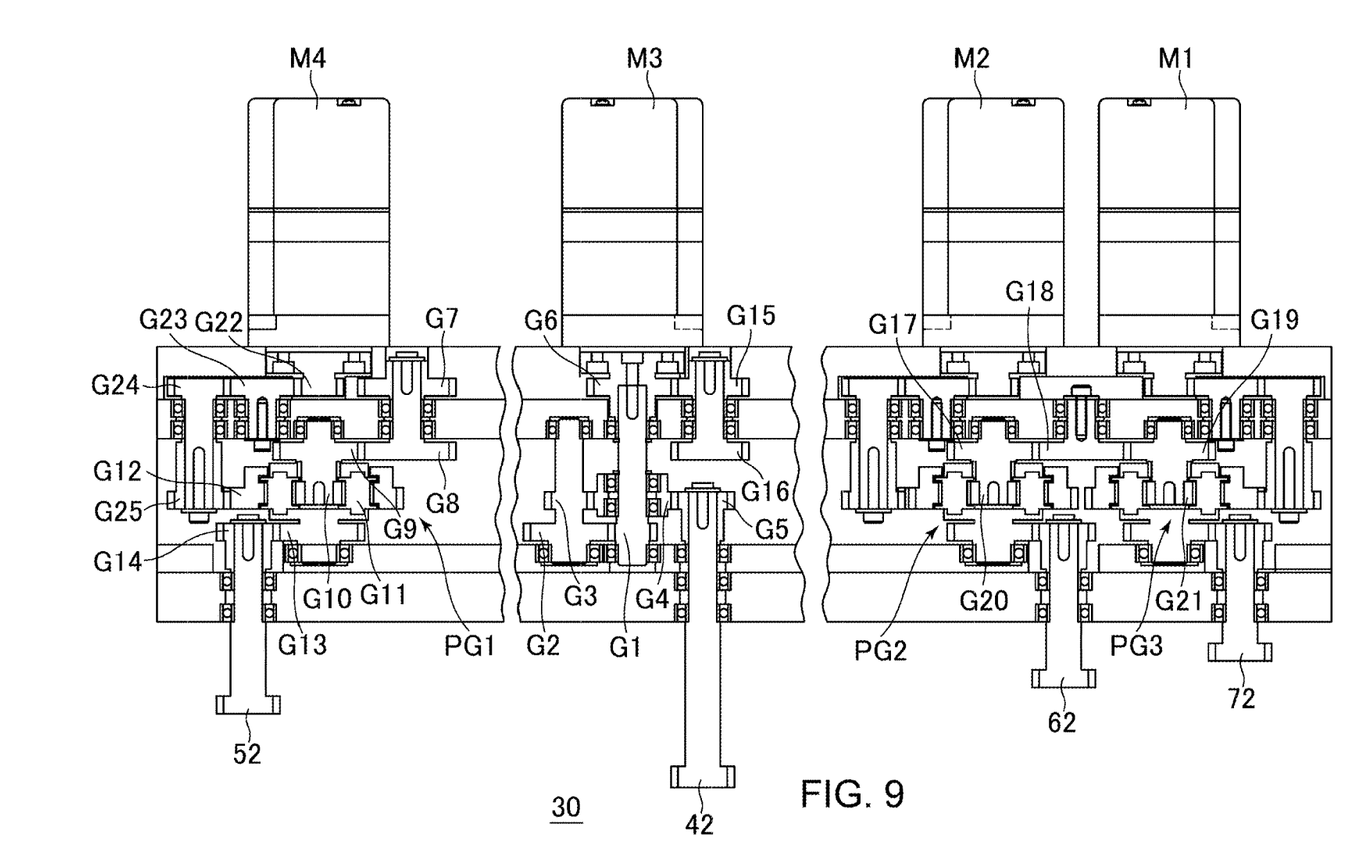
FIG. 9 is a developed view illustrating a differential device of the first embodiment.

Next, based upon FIG. 9, a transmission route of torque from the electric motors M1 to M4 to the turning input gear 42 and the first to third ring input gears 52, 62, 72 will be described. In FIG. 9, hatching of the cross section is omitted for the purpose of illustration. It should be noted that without providing the differential device, the electric motors M1 to M4 can be directly coupled respectively to the turning input gear 42 and the first to third ring input gears 52, 62, 72. Still, with the differential device, the welding head turning gear and the ring gears can rotate using only one electric motor, which is suitable as a control device of the electric motor can be simplified.

In the differential device 30, torque is transmitted from the electric motor M3 to all of the turning input gear 42 and the first to third ring input gears 52, 62, 72. For the purpose of convenience, a state in which the electric motors M1, M2, M4 are inoperative will be described as a specific example.

First, when the electric motor M3 is driven, torque is transmitted to the turning input gear 42 via gears G1, G2, G3, G4, G5.

Meanwhile, torque is transmitted from a gear G6 to a gear G7, and then the torque transmitted to the gear G7 is transmitted via gears G8, G9 to a first sun gear G10 of a first planetary gear mechanism PG1. When the first sun gear G10 rotates, the first planet gear G11 revolves around a shaft of the first sun gear G10, and torque caused by the revolution of the first planet gear G11 is transmitted to the gear G13.

The torque transmitted to the gear G13 is transmitted via a gear G14 to the first ring input gear 52. Moreover, on a first annular gear G12 of the first planetary gear mechanism PG1, both an internal gear and an external gear are formed.

Torque transmission routes to the second and third ring input gears 62, 72 are similar to the torque transmission route to the first ring input gear 52, torque transmission routes to the second and third ring input gears 62, 72 will be described briefly. Torque generated by the electric motor M3 is transmitted from the gear G6 via gears G15, G16 also to a gear G17. The differential device 30 includes second and third planetary gear mechanisms PG2, PG3, and the torque transmitted to the gear G17 is transmitted directly or via gears G18, G19 to sun gears G20, G21 of the second and third planetary gear mechanisms PG2, PG3. Thereafter, similar to the first planetary gear mechanism PG1, torque caused by revolution of the second and third planetary gear mechanisms PG2, PG3 is transmitted respectively to the second and third ring input gears 62, 72.

Thus, due to the driving of the electric motor M3, torque can be transmitted to all of the turning input gear 42 and the first to third ring input gears 52, 62, 72. Remarkably, when the electric motor M3 is operative and the other electric motors M1, M2, M4 are inoperative, each gear ratio should be set so that the welding head turning gear 40 and the first to third ring gears 50, 60, 70 rotate in a same direction at a same rotating speed.

Next, a process of rotating the first ring input gear 52 at a different rotating speed with respect to the turning input gear 42 will be described. As processes involving the second and third ring input gears 62, 72 are similar to the process involving the first ring input gear 52, the processes involving the second and third ring input gears 62, 72 will not be described.

When the electric motor M4 is driven in a state in which the electric motor M3 is in operation to rotate the welding head turning gear 40 and the first ring gear 50 in a same direction at a same rotating speed, torque is transmitted via gears G22, G23, G24, G25 to the first annular gear G12. Since a rotation of the first annular gear G12 accelerates or decelerates a revolution speed of the first planet gear G11 depending on a rotating direction of the electric motor M4, a rotating speed of the first ring input gear 52 can be controlled by controlling the rotating direction of the electric motor M4.

It should be noted that instead of the planetary gear mechanism, a differential gear mechanism may be employed in the differential device 30. Specifically, in employment of the differential gear mechanism instead of the first planetary gear mechanism PG1, facing bevel gears should be provided between the gears G9 and G13, and a pinion gear engaged with this bevel gear should be provided instead of the first planet gear G11. In this case, torque caused by a rotation of the pinion gear is to be transmitted to the first ring input gear 52.

While the welding apparatus including the three ring gears was described above, the welding apparatus may include not exceeding two ring gears or four or more ring gears according to the number of torque use means. An order in the axial direction of the welding head turning gear and the ring gears may be altered appropriately.

Moreover, the welding apparatus of the present disclosure may be configured to be symmetrical to the above-described welding apparatus 10. In other words, the welding apparatus may be configured so that: first, each of the welding head turning gear and the ring gears includes the external teeth on the entire circumference of the outer peripheral surface, and the internal teeth are provided to at least part of the inner peripheral surface of the ring gear; second, the turning input gear and the ring input gears are provided so as to be engaged with the external teeth of the welding head turning gear and the ring gears, and the ring output gears are provided so as to be engaged with the internal teeth of the ring gears; and third, the welding head is provided on the inner diameter side of the welding head turning gear.

Additionally, the welding apparatus of the present disclosure need not necessarily be fixed on the outer peripheral surface of the pipe as a workpiece, but may be fixed inside of the pipe via a fixing member. Also, the present disclosure may be used as a machining apparatus by attaching a cutting tool thereto in substitution for the welding torch.

As described above, according to the present disclosure, a light-weight and compact welding apparatus can be provided, thereby achieving reduction of processing and manufacturing cost.

The invention claimed is:

1. A welding apparatus comprising:
   a housing in annular shape having a guide surface continuous in a circumferential direction of facing surfaces in an axial direction;
   a welding head turning gear in annular shape disposed between the facing surfaces, the welding head turning gear including internal teeth on an entire circumference of an inner peripheral surface of the welding head turning gear;
   a ring gear in annular shape disposed between the facing surfaces, the ring gear including internal teeth on an entire circumference of an inner peripheral surface and external teeth on at least a part of an outer peripheral surface of the ring gear, the ring gear pivotably provided with respect to the welding head turning gear at more than or equal to a predetermined angle;
   a turning input gear engaged with the internal teeth of the welding head turning gear and a ring input gear engaged with the internal teeth of the ring gear;
   a plurality of electric motors coupled to the housing and positioned at one side in the axial direction with respect to the housing, the plurality of electric motors configured to transmit torque to the turning input gear and the ring input gear;
   a ring output gear coupled to the welding head turning gear, the ring output gear engaged with the external teeth; and
   a welding head having a welding torch positioned at an other side in the axial direction with respect to the housing, the welding head having a torque use means to which torque is transmitted from the ring output gear,
   wherein the welding head turning gear and the ring gear are rotatably supported with respect to the housing by a guide member with respect to the guide surface.

2. The welding apparatus according to claim 1,
   wherein the ring gear is provided pivotably only at a predetermined angle with respect to the welding head turning gear, and
   wherein the external teeth engaged with the ring output gear are provided within a range of the predetermined angle.

3. The welding apparatus according to claim 1,
   wherein the torque use means includes either one of a wire feeding mechanism configured to feed a wire for welding, a torch axial direction movement mechanism configured to move the welding torch forward and backward in the axial direction of the housing or a torch radial direction movement mechanism configured to move the welding torch forward and backward in the radial direction of the housing.

4. The welding apparatus according to claim 1 further including a differential device provided between the plurality of electric motors and the housing, the differential device configured to transmit torque to the turning input gear and the ring input gear,
   wherein the welding apparatus is configured to rotate the welding head turning gear and the ring gear in a same direction at a same rotating speed when one of the electric motors is operative and the others of the electric motors are inoperative, and
   wherein the welding apparatus is configured to rotate the ring gear at a rotating speed different from a rotating speed of the welding head turning head when the others of the electric motors are operative.

5. The welding apparatus according to claim 1,
   wherein the torque use means includes at least one of a wire feeding mechanism configured to feed a wire for welding, a torch axial direction movement mechanism configured to move the welding torch forward and backward in the axial direction of the housing and a torch radial direction movement mechanism configured to move the welding torch forward and backward in the radial direction of the housing,
   wherein the plurality electric motors are first to fourth electric motors,
   wherein the ring gear includes first to third ring gears,
   wherein the ring input gear includes first to third ring input gears configured to transmit torque respectively to the first to third ring gears, and
   wherein the ring output gear includes first to third ring output gears configured to transmit torque respectively to the wire feeding mechanism, a torch vertical movement mechanism and a torch approaching/receding mechanism.

6. The welding apparatus according to claim 5 further including
   a differential device disposed between the first to fourth electric motors and the housing, the differential device configured to transmit torque to the turning input gear and the first to third ring input gears,
   wherein the welding apparatus rotates the welding head gear and the first to third ring gears in a same direction at a same rotating speed when the first electric motor is operative and the second to fourth electric motors are inoperative, and
   wherein the welding apparatus rotates the first, second and third ring gears at a different rotating speed from a rotating speed of the welding head turning gear when the second, third or fourth electric motor is operative.

* * * * *